Jan. 25, 1944.   H. S. CAMPBELL   2,339,836
AIRCRAFT OF THE TYPE EQUIPPED WITH SUSTAINING ROTORS
Filed March 16, 1940
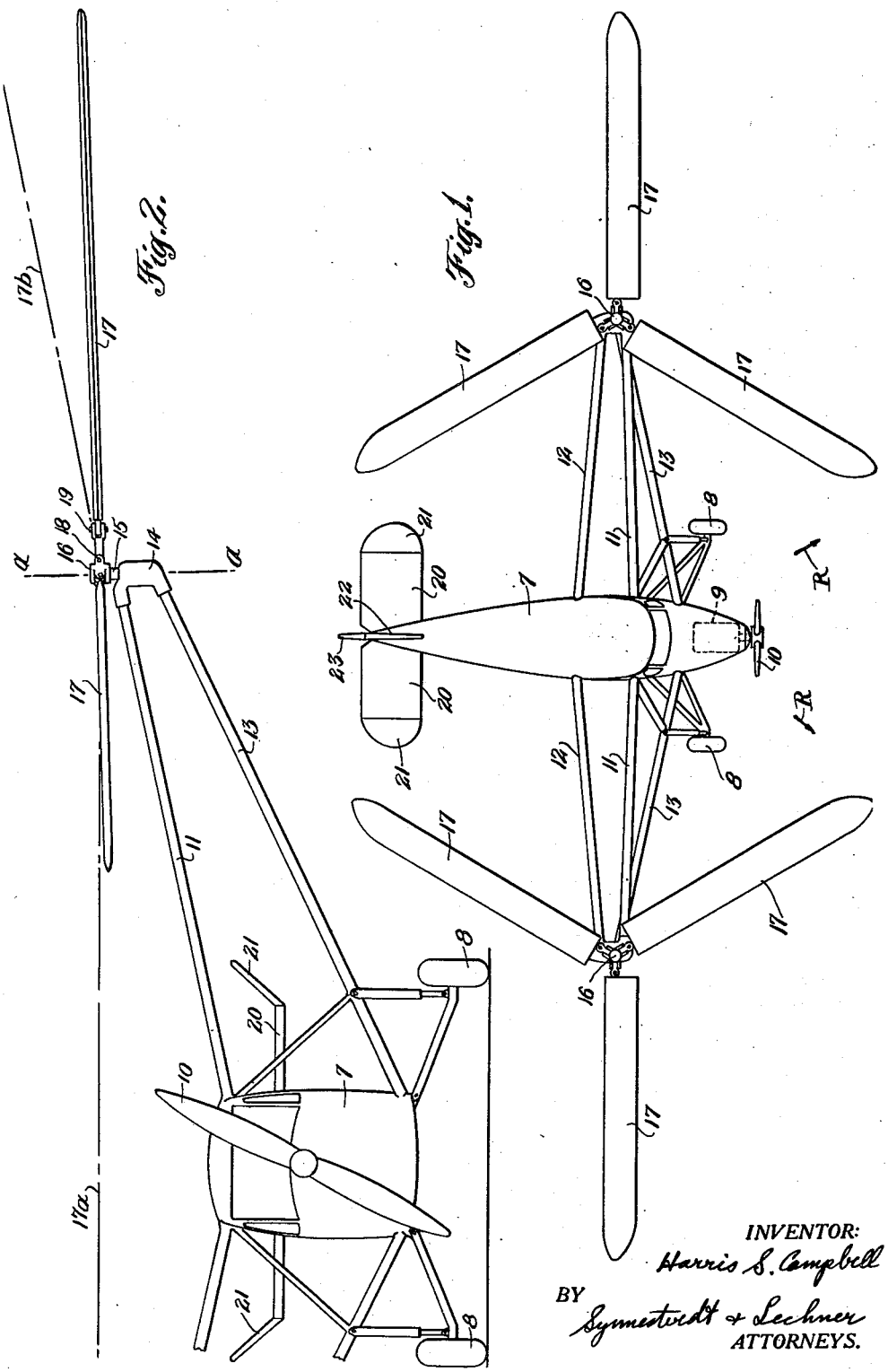
INVENTOR:
Harris S. Campbell
BY
Symestvedt & Lechner
ATTORNEYS.

Patented Jan. 25, 1944

2,339,836

UNITED STATES PATENT OFFICE 2,339,836

AIRCRAFT OF THE TYPE EQUIPPED WITH SUSTAINING ROTORS

Harris S. Campbell, Bryn Athyn, Pa., assignor to Autogiro Company of America, Willow Grove, Pa., a corporation of Delaware Application March 16, 1940, Serial No. 324,248

2 Claims. (Cl. 244—17)

This invention relates to aircraft equipped with sustaining rotors, and is especially concerned with the twin rotor type of machine in which each rotor incorporates blades pivotally mounted for flapping movement and in which the two rotors of the pair are mounted in side-by-side relation.

Generally stated, the invention is especially useful for improvement of stability of aircraft of the twin rotor type.

One of the principal objects of the invention is the introduction of a dihedral effect by arranging two such rotors so that when viewed in plan, the left-hand rotor rotates counterclockwise and the right-hand rotor clockwise. Preferably, the dihedral effect is further increased by location of the physical axes of the two rotors in upwardly and inwardly inclined positions.

How the foregoing objects and advantages are achieved will appear more fully from the following description referring to the accompanying drawing, in which—

Figure 1 is a top plan view of an aircraft constructed in accordance with the present invention; and Figure 2 is a front view of the machine of Figure 1, the right-hand rotor (when viewed from the pilot's seat) and its supporting outrigger being broken away to facilitate illustration on an enlarged scale.

In connection with the following description, it is noted that the invention is applicable to a variety of types of twin rotor machines. For instance, the invention is useful in a twin rotor machine in which the rotors are adapted to be autorotationally or aerodynamically rotated, at least during translational flight, the translational flight being induced by a separate motor driven propulsive airscrew. As another example, the invention is applicable to a machine of the helicopter type incorporating a pair of side-by-side rotors adapted to be mechanically driven in flight, and further adapted to effect translational movement in whole or only in part under the influence of a horizontal component of the thrust of the rotors set up as a result of inclining the real or virtual axes thereof.

In view of the above, it will be plain that features of the invention are also applicable to various composite types of aircraft, for instance, an aircraft having rotors adapted for power driven operation and autorotational operation under different conditions.

In the drawing, the invention is illustrated as applied to a twin rotor machine in which the rotors are adapted for autorotational operation at least under some flight conditions.

The body or fuselage of the aircraft is indicated at 7, the same being provided with suitable landing gear incorporating wheels 8, or the equivalent. The forward propulsion engine is shown at 9 in Figure 1 and the propulsive airscrew driven thereby at 10. Each of the two side-by-side rotors is supported by an outrigger structure incorporating two upper struts 11 and 12 preferably connected with an upper fuselage longeron, and a lower strut 13 which is connected to the fuselage framing, for example, to a lower longeron.

In connection with the rotors, it is to be understood that control functions may be assigned thereto as by providing means for tilting the rotor hubs or for pitch change of the rotor blades as disclosed, for example, in copending applications of Juan de la Cierva Serial No. 645,985, filed December 6, 1932, and Serial No. 698,372, filed November 16, 1933. However, since such mechanisms form no part of the present invention per se, they are not illustrated herein.

The member 14 at the outer end of each outrigger serves to mount a hub supporting spindle 15 on which the hub 16 is journalled.

Each rotor incorporates a plurality of blades 17, three being illustrated in the drawing, each blade being connected with the hub 16 by pivot means including at least a "flapping" pivot 18 providing freedom for individual flapping movement of the blades in a direction generally transverse their mean rotative path of travel, in order to compensate for differential lift effects in translational flight. A "drag" or lag-and-lead pivot 19 is also desirably employed in the connection of each blade to the hub.

In accordance with the invention, a high degree of lateral stability is afforded, by arranging the rotors to rotate in the directions indicated in Figure 1 by the arrows R. This serves to introduce an overall dihedral angle in the rotor systems.

The manner in which this dihedral is produced is graphically illustrated in Figure 2 by the dot and dash line indication of average blade angle positions at 17a and 17b. Owing to inertial lag of the blades in flapping (when they are moving on their flapping hinges to accommodate differential lift in forward flight), the average position of a blade when it lies on the transverse rotor diameter on the advancing side is lower than its average position on said diameter on the retreating side, even though the blade when advancing is in general rising, and when retreating is in general falling. These average positions are represented by the lines 17a and 17b, respectively, and, with the described direction of rotation of the two rotors, they automatically introduce a "natural" dihedral effect during translational flight.

If desired, the foregoing "natural" dihedral effect may be supplemented by slight upward and inward inclination of the axes of rotation of the two rotors, as is indicated by the line a—a applied to Figure 2. By employing both of these two means of introducing an overall lateral dihedral, lateral stability is provided under all conditions of flight ranging all the way from high speed translational flight to flight in a substantially vertical path.

Additional stability is preferably derived from an empennage structure incorporating horizontal finning 20 having dihedraled tips 21—21, and further incorporating a vertical fin 22 and, if desired, a controllable rudder 23.

It will be understood that any suitable rotor drive means may be employed, either for starting the rotors prior to take-off in the case of a machine in which the rotors are normally aerodynamically driven in flight, or for all normal flight operation, as in a machine of the helicopter type. In the aircraft illustrated in the drawing, the forward propulsion engine 9 may conveniently be employed as the source of power for driving the rotors.

I claim:

1. An aircraft having a pair of side-by-side sustaining rotors, each rotor incorporating a hub and blades connected thereto with freedom for flapping movement, the direction of rotation of the rotors being such that when viewed in top plan, from adjacent the rear of the machine, the left-hand rotor rotates counterclockwise and the right-hand rotor clockwise.

2. An aircraft having a pair of side-by-side sustaining rotors, each rotor incorporating a hub and blades connected thereto with freedom for flapping movement, the direction of rotation of the rotors being such that when viewed in top plan, from adjacent the rear of the machine, the left-hand rotor rotates counterclockwise and the right-hand rotor clockwise, and the axes of the two rotors being inclined upwardly and inwardly toward each other.

HARRIS S. CAMPBELL.